(12) United States Patent
Madl et al.

(10) Patent No.: US 12,153,710 B2
(45) Date of Patent: Nov. 26, 2024

(54) SYNTHETIC DATA GENERATION

(71) Applicant: Amazon Technologies, Inc., Seattle, WA (US)

(72) Inventors: Tamas Madl, Amsterdam (NL); Matthew James Howard, London (GB)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 17/709,254

(22) Filed: Mar. 30, 2022

(65) Prior Publication Data

US 2023/0315899 A1 Oct. 5, 2023

(51) Int. Cl.
*G06F 21/62* (2013.01)
(52) U.S. Cl.
CPC .............................. *G06F 21/6245* (2013.01)
(58) Field of Classification Search
CPC ................................................. G06F 21/6245
See application file for complete search history.

(56) References Cited

U.S. PATENT DOCUMENTS

| | | | |
|---|---|---|---|
| 2018/0018590 A1* | 1/2018 | Szeto | G16H 50/20 |
| 2022/0126864 A1* | 4/2022 | Moustafa | B60W 30/182 |
| 2022/0374614 A1* | 11/2022 | Zhang | G06N 3/045 |
| 2023/0351036 A1* | 11/2023 | Gilmore | G06F 21/6227 |

FOREIGN PATENT DOCUMENTS

EP 3591586 A1 1/2020

OTHER PUBLICATIONS

International Search Report and Written Opinion, PCT App. No. PCT/US23/16428 Jun. 26, 2023, 15 pages.

* cited by examiner

*Primary Examiner* — Kristie D Shingles
(74) *Attorney, Agent, or Firm* — Nicholson DeVos Webster & Elliott LLP

(57) ABSTRACT

Techniques for generating synthetic data are described. An exemplary approach includes receiving one or more requests to generate synthetic data based on a first dataset; generating the synthetic dataset is generated according to the request by choosing a set of synthetic datapoints between pairs of datapoints of the first dataset along a line connecting them while sampling a likely value of a local probability distribution; and providing the synthetic dataset as configured by the request.

20 Claims, 13 Drawing Sheets

1: Inputs:
   - $T$ data points in dataset $X = (x_i, y_i) \in \mathbb{R}^D$ with $D$ dimensions
   - number of neighbors $k$
   - neighborhood size $s$
   - $priv \in \{True, False\}$ whether to synthesize privacy-preserving data by minimizing identifiability (or follow data distribution as closely as possible)
   - feature importance weights $w$
   - set of $m$ distance metrics used to minimize identifiability $\{M_1, ..., M_m\}$
2: Initialize:
   - number of classes $C = |y_1, ..., y_T|$
   - $C$ functions returning nearest neighbors within their class $cNN_1, ..., cNN_C$ under a metric weighted by $w$
   - $m$ functions returning nearest neighbors within entire dataset $pNN_1, ..., pNN_m$, using given identifiability metric(s)
   - if $priv = True$, initialize $G = \{g_1, ..., g_T\}, g_i \leftarrow maxM_j\left(x_i, pNN_j(x_i, 1)\right)$, i.e. $g_i$ is the 'no go zone' around data point $g_i$ – no synthetic point can be closer than this to preserve 0-identifiability. If $priv = False$, set all $g_i = 0$
   - $R(A, B, E) = A + \frac{\overline{AE} \cdot \overline{AB}}{\overline{AB} \cdot \overline{AB}} * \overline{AB}$, i.e. $R$ is a function projecting instance $E$ onto the line connecting $A$ and $B$
   - $S \leftarrow \{\}$ as the resulting synthetic dataset
3: for $t = 1$ to $T$ do
4:     $A \leftarrow x_t$
5:     $K \leftarrow cNN_{y_t}(A, k)$, the $k$ next nearest class neighbors of $A$
6:     for $i = 1$ to $k$ do
7:       $B \leftarrow K_i$, the $i$'th neighbor of $A$
8:       $N \leftarrow cNN_{y_t}(A, s) \cup cNN_{y_t}(B, s)$, neighborhoods of size $s$ near $A$ & $B$
9:       $M \leftarrow R(A, B, N_1), ..., R(A, B, N_2)$, data points in $N$ projected on $\overline{AB}$
10:      $P(\hat{x}) = KDE(M, \hat{x})$, a Kernel Density Estimate of this local distribution at given offset $\hat{x}$ from $A$, where $0 \leq \hat{x} \leq 1$
11:      $Q(\hat{x}_i) = A + \hat{x}(B - A)$ mapping offset $\hat{x}$ back to $D$-dimensional instances
12:      $\hat{P}(\hat{x}) = \begin{cases} P(\hat{x}) & \text{if } \forall_j M_j(A, Q(\hat{x})) \geq g_A \text{ and } \forall_j M_j(B, Q(\hat{x})) \geq g_B \\ 0 & \text{otherwise (inside 'no-go zone')} \end{cases}$
13:      $\hat{x}_{max} = argmax_{\hat{x}} \begin{cases} \hat{P}(\hat{x}) & \text{if } priv = True \\ P(\hat{x}) & \text{otherwise (disregard identifiability)} \end{cases}$
14:      if $\hat{P}(\hat{x}_{max}) > 0$ then
15:        $\hat{A} \leftarrow Q(\hat{x}_{max})$
16:        $S \leftarrow S \cup \hat{A}$
17:      end if
18:     end for
19: end for
20: return $S$: set of synthetic data points generated

FIG. 2

1: Inputs:
   - $T$ data points in dataset $X = (x_i, y_i) \in \mathbb{R}^D$ with $D$ dimensions
   - number of classes $C$
   - number of neighbors $k$
   - neighborhood size $s$
   - feature importance weights $w$
   - $priv \in \{True, False\}$ whether to synthesize privacy-preserving data by minimizing identifiability (or follow data distribution as closely as possible)
   - set of $m$ distance metrics used to minimize identifiability $\{M_1, ..., M_m\}$ 2: Initialize:
   - $C$ functions returning nearest neighbors within their respective class $cNN_1, ..., cNN_C$, under a metric weighted by $w$
   - $m$ functions returning nearest neighbors within the entire dataset $pNN_1, ..., pNN_m$, using the given identifiability metric(s)
   - if $priv = True$, initialize $G = \{g_1, ..., g_T\}$, $g_i \leftarrow \max M_j(x_i, pNN_j(x_i, 1))$, i.e. $g_i$ is the 'no go zone' around data point $g_i$ - no synthetic point can be closer than this to preserve θ-identifiability

- $S \leftarrow \{\}$ as the resulting synthetic dataset
3: for $t = 1$ to $T$ do
4:     $A \leftarrow x_t$
5:     $K \leftarrow cNN_{y_t}(A, k)$, the k next nearest class neighbors of $A$
6:     for $i=1$ to $k$ do
7:         $B \leftarrow K_i$, the i'th neighbor of $A$
8:         $N \leftarrow cNN_{y_t}(A, s) \cup cNN_{y_t}(B, s)$, neighborhoods of size $s$ near $A$ & $B$
9:         for $j=1$ to $D$ do
10:            $DE_j^i = Multinomial(\theta_j^i)$, local density estimation in a single data dimension with a multinomial distribution
11:        end for
12:        $\hat{A} = \{\hat{A}_1, \hat{A}_2, ..., \hat{A}_D\}$, sample each feature from corresponding feature-wise density estimators $\hat{A}_j \sim DE_j^i$
13:        while $\forall_j M_j(A, Q(\hat{A})) > g_A$ and $\forall_j M_j(B, Q(\hat{A})) > g_B$ or timeout do
14:            $\hat{A} = \{\hat{A}_1, \hat{A}_2, ..., \hat{A}_D\}$, sample each feature from corresponding density estimators $\hat{A}_j \sim DE_j^i$ while no-go zone violated
15:        end while
16:        $S \leftarrow S \cup \hat{A}$
17:    end for
18: end for

FIG. 6

SYNTHETIC DATA GENERATION

BACKGROUND

Bioinformatics research is characterized by large datasets, which are often High in Dimensionality but Low in Sample Size (HDLSS) due to practical and cost-related limitations on sample sizes. This can lead to various challenges when applying data-hungry machine learning algorithms—especially in cases of class imbalance such as if some categories to be classified have significantly less datapoints than others. The minority class with fewer samples is often also the class of interest.

BRIEF DESCRIPTION OF DRAWINGS

Various embodiments in accordance with the present disclosure will be described with reference to the drawings, in which:

FIG. 2 illustrates examples of an DDE algorithm to be implemented by the synthetic dataset generation service that utilizes DDE.

FIG. 6 illustrates examples of an DDE algorithm to be implemented by the synthetic dataset generation service that utilizes DDE.

DETAILED DESCRIPTION

Figure 1:
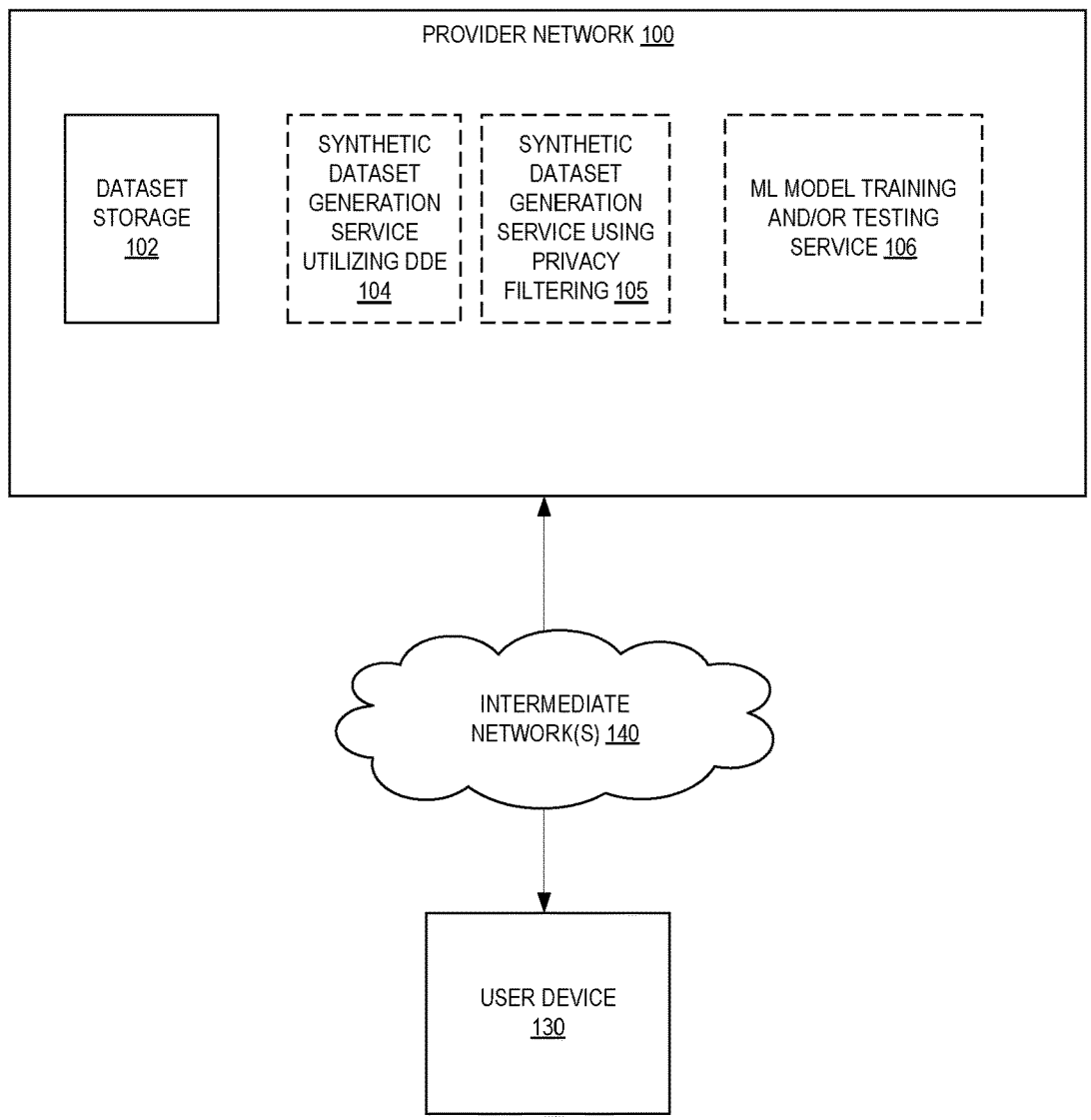
FIG. 1 illustrates examples of a provider network that supports the generation of a synthetic dataset by using datapoint density estimation (DDE) and/or performing privacy filtering on generative models (such as GANs).

The present disclosure relates to methods, apparatus, systems, and non-transitory computer-readable storage media for generating synthetic data. Synthetic data generation is receiving increasing attention in the life sciences, to help address stringent requirements for data privacy and in situations of insufficient dataset sizes, data imbalance and bias, or stringent requirements for data privacy.

Training and using machine learning models in domains with sensitive and personally identifiable information, such as the life sciences, presents significant legal, ethical, and trust challenges. In many cases, such as genomics, simple de-identification does not protect adequately against privacy attacks. Data synthesis has been proposed as a potential mechanism that can be a legally and ethically appropriate solution to the sharing and processing of sensitive data. It is possible to synthesize a dataset that allows accurate machine learning (ML) model training with minimal privacy risk, depending on privacy definition and requirements.

Various minority oversampling methods have been proposed in machine learning literature in order to mitigate imbalance and create synthetic samples. Although effective on certain benchmark datasets, their applicability for high-dimensional bioinformatics data has remained limited. The most prevalent class of methods, Synthetic Minority Oversampling Technique (SMOTE) and its variants, often fail to attenuate the bias towards the majority class in performance metrics, and in many cases do not significantly outperform the trivial baseline of random resampling in case of classical machine learning and deep learning algorithms.

Although many approaches exist for synthesizing low-dimensional datasets in a privacy-preserving fashion, the majority of high-dimensional data synthesis approaches are based on generative adversarial networks (GANs) where a discriminator and a generator play a min-max form of game to optimize a given distance metric between the true and synthetic data distributions. However, in terms of their applicability to privacy-preserving data generation, GANs face challenges. For example, the generator can 'win' by remembering a polynomial number of training examples which leads to compromised privacy as well as limited generalization due to the lack of diversity. Additionally, noise during the GAN training procedure, for example through differential privacy techniques, has been explored in literature, but has been shown to significantly degrade accuracy of the model compared to training on the unperturbed dataset.

Finally, due to the low number of datapoints that have unique characteristics (e.g., patients with a rare disease), estimating distributions of very high-dimensional datasets without replicating individuals is extremely challenging—the higher the dimensionality, and the larger the synthetic dataset being generated, the higher the risk of re-identification.

In some examples, when privacy is desired, datapoints are to be unidentifiable to protect against reidentification scenarios by minimizing the risk of singling out as estimated by the identifiability risk. Identifiability can be defined as follows. Let w be a user-defined weight vector encoding the identifiability of various features based on their domain knowledge. In the simplest case, $w_i$ can be set to 0 for non-identifiable features and to 1 for the rest. In the experiments below, we will use entropy as the weight vector, to capture the informativeness of individual features.

T and S denote a real and corresponding synthetic dataset, respectively. Let $r_i$ denote the minimum distance between datapoint $x_i$ and its nearest neighbor in weighted Euclidean distance space, such that $$r_i = \min_{x_j \in T/x_i} \|w \cdot (x_i - x_j)\|,$$

and, similarly, let $\hat{r}_i$ denote the minimum distance between a datapoint $x_i$ and its next-closest synthetic datapoint $\hat{x}_j$:

$$\hat{r}_i = \min_{\hat{x}_j \in S} \|w \cdot (x_i - \hat{x}_j)\|.$$

A synthetic dataset S is ∈-identifiable from T if $$L(T, S) = \frac{1}{N}\sum_{i=1}^{|T|} \mathbb{I}(\hat{r}_i < r_i) < \epsilon$$

Detailed herein are examples of synthetic data generation with a different approach than GANs. In particular, the synthesis through sampling from local kernel density estimates sampled between datapoints in a dataset with, in some examples, a built-in privacy risk filtering procedure. In some examples, the datapoints are nearest neighbors. Examples of this approach may be referred to as Datapoint Density Estimation (DDE). DDE has a minimal identifiability risk. Regulatory compliance frameworks such as the General Data Protection Regulation (GDPR) (such as article 29 of the GDPR) in Europe and the Family Educational Rights and Privacy Act (FERPA), Title 13, and the Health Insurance Portability and Accountability Act (HIPAA) in the US are often concerned with protecting individuals from being identified or singled out based on their data. DDE can parameterized with one or several metrics in order to avoid the possibility of closest record identification according to those metrics. Unlike other such approaches such as 1) multiple metrics can be used and 2) the risk can be set to zero; rather than explicitly allowing a certain percentage of persons to be identified.

Higher statistical utility by preserving nonstandard distributions. Unlike most GANs, in addition to well-behaved data distributions, DDE is able to model skewed, long tail or multi-modal distributions faithfully. Unlike GANs, which tend to work well on datasets that are low in intrinsic dimensionality (such as data lying on a lower-dimensional manifold inside a potentially higher-dimensional space), DDE is able to model densely high-dimensional datasets, since it always projects local neighborhoods onto a one-dimensional kernel density estimate regardless of actual data dimensionality.

FIG. 1 illustrates examples of a provider network that supports the generation of a synthetic dataset by using DDE and/or performing privacy filtering on generative models (such as GANs). Users of the provider network 100 may have personally identifiable information (PII) data which may be challenging to distribute to other parties due to privacy concerns, impeding collaboration and value extraction, especially in regulated industries. Even if they mask personal identifiable fields (name, id, address, etc.), an attacker might be able to identify an individual if they have sufficient generic data of the target.

Even though direct identifiers (e.g., phone number, email, social security number, etc.) have been removed. There are still quasi-identifiers (e.g. age, gender, initial 3 digit of zip code, title, height, etc.) that could be used in combination to find an individual. This risk can be either high or low, depending on the dataset. For example, dataset might have only 1 person who is male, has age above 70 and has zip code starting with 100. Removing more data will reduce the risk but it also affects the accuracy of model training. The situation is even more challenging for high-dimensional healthcare and life sciences data, such as genomic data, where a large number of identification and phenotype inference attacks have been proposed in scientific literature.

As shown in FIG. 1, the provider network 100 includes dataset storage 102 to store original datasets and/or synthetic datasets, in some examples, a synthetic dataset generation service 104 that utilizes DDE, and, in some examples, a synthetic dataset generation service using privacy filtering 105. Both types are detailed below. For example, a user using user device 130 may request that the synthetic dataset generation service that utilizes DDE 104 pull at least a proper subset of an original dataset stored in dataset storage 102 to generate a synthetic dataset. In some examples, tabular data is used and exemplary column types include, but are not limited to numerical, Boolean, categoricals or labels, and/or datetimes. More specific details of how the synthetic dataset generation service that utilizes DDE 104 performs this generation are detailed in subsequent figures. Note that the synthetic dataset generation service that utilizes DDE 104 may be used to generate datapoints that are not ∈-identifiable. In some examples, the synthetic dataset generation service using privacy filtering 105 uses a trained generator model (e.g., a generative adversarial network, copula, multivariate kernel density estimation model, etc.) to approximate a data distribution to obtain a sample which is then privacy filtered such that any datapoint added is not identifiable.

In some examples, the provider network 100 includes a ML model training and/or testing service 106. This service may be used to test the synthetic dataset against testing data of the original dataset. In some examples the request (or a plurality of requests) allows a user to set parameters for the generation of the synthetic dataset by the synthetic dataset generation service that utilizes DDE 104 or the synthetic dataset generation service using privacy filtering 105. For example, the request may include one or more of an identification of what features to exclude from the original dataset, an identification of location of the original dataset, the original dataset itself, a number of synthetic datapoints to generate, whether privacy should be taken into consideration when generating the synthetic datapoints of the dataset, an identification of location of where to store the synthetic dataset, a number of pairs of datapoints to consider, a neighborhood size, an indication of metrics to use to minimize identifiability, etc.) and/or parameters to test the synthetic dataset such what data to keep from the original dataset as testing data, what accuracy metric to use, what model to use (and, in some examples, to train with both datasets), etc. In some examples, this information is provided via a graphical user interface, however, command line interface commands may also be used.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 140

(e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users 130 can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

FIG. 2 illustrates examples of an DDE algorithm to be implemented by the synthetic dataset generation service 104 that utilizes DDE. Typically, the algorithm is performed as a method by a processing device such as a CPU, GPU, or APU. Note that the algorithm is stored as one or more code modules to be executed by such a processing device.

Line 1 of the illustrated algorithm details exemplary inputs. These inputs may be provided by the user requesting the creation of the synthetic data. Note that some of the inputs are not always used (for example, there may be a default of privacy (meaning priv is not supplied). In some examples, default values are used such as the number of pairs of datapoints, metric(s) to use, etc.

Line 2 illustrates examples of items to be initialized. These include a number of classes (e.g., number of features to evaluate), a collection of pairs of datapoints per class (such as A and B shown in subsequent figures), a collection of pairs of datapoints for the entire dataset to the collection of pairs of datapoints, a configuration of "no go zones" which are zones around a point that synthetic datapoint is not allowed to exist, an empty set, and a projection function for datapoints.

Within a first for loop, lines 4 and 5 set a first datapoint and pairs of datapoints.

Within the second for loop, line 7 sets a second datapoint to be evaluated as a datapoint relative to the first point. Line 8 sets neighborhoods for the datapoint to pairs of datapoints for the first and second datapoint. Line 9 details a 1-dimensional projection of those set neighborhoods onto the line between the first and second points. Line 10 performs a KDE of the projections at a given offset. Line 11 maps the offset back to high-dimensional space (D-dimensions). Line 12, when privacy is considered, determines if a given projected datapoint is within a no go zone. Line 13 determines a maximum value for the probability (either as determined at line 10 (disregarding identifiability) or line 12). If the maximum value for the probability is greater than 0, then, the maximum value of the datapoint is set at line 15 and potentially added at line 16. Note that other values other than maximum may be used (as detailed later).

As shown, DDE makes density estimation tractable by modeling data distributions as locally linear manifolds. In particular, the algorithm obtains synthetic datapoints from one-dimensional kernel density estimates spanned between neighboring datapoints. Low-dimensional kernel density estimates of local data neighborhoods between nearest neighbors are leveraged to computationally efficiently sample synthetic datasets which preserve the distribution and structure of the original data. In addition to high-fidelity data generation, nearest-neighbor based density approximation also allows explicitly minimizing identifiability risk, by avoiding synthetic data instances nearer to real instances than their next-nearest neighbors.

Figure 3:
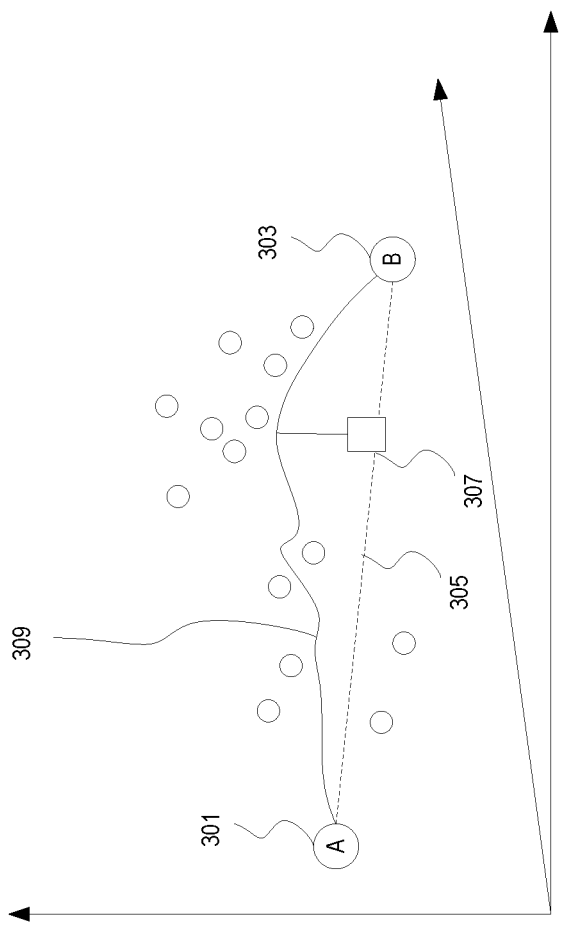
FIG. 3 illustrates examples of DDE.

FIG. 3 illustrates examples of DDE. In this illustration, a new synthetic datapoint 307 is generated between a pair of nearest neighbors A 301 and B 303 along the line 305 connecting the pair of pairs of datapoints using information from other neighborhoods (the unlabeled circles). In particular, the generation of the synthetic datapoint 307 attempts to maximize a local probability distribution (such as according to a local Kernel Density Estimate (KDE) shown as the non-straight line 309). Note that sampling or other values other than a maximum may be used.

Figure 4:
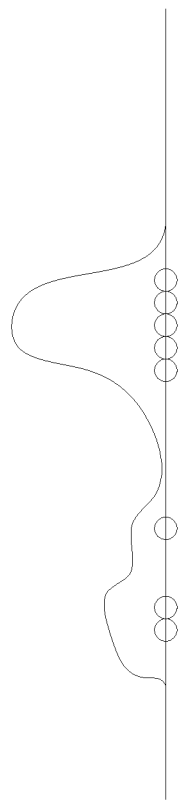
FIG. 4 illustrates examples of KDE in DDE.

KDEs are computed in 1-D by projecting local neighborhoods onto the line connecting A and B to avoid having to compute many high-dimensional KDEs, which would be intractable. FIG. 4 illustrates examples of KDE in DDE.

Figure 5:
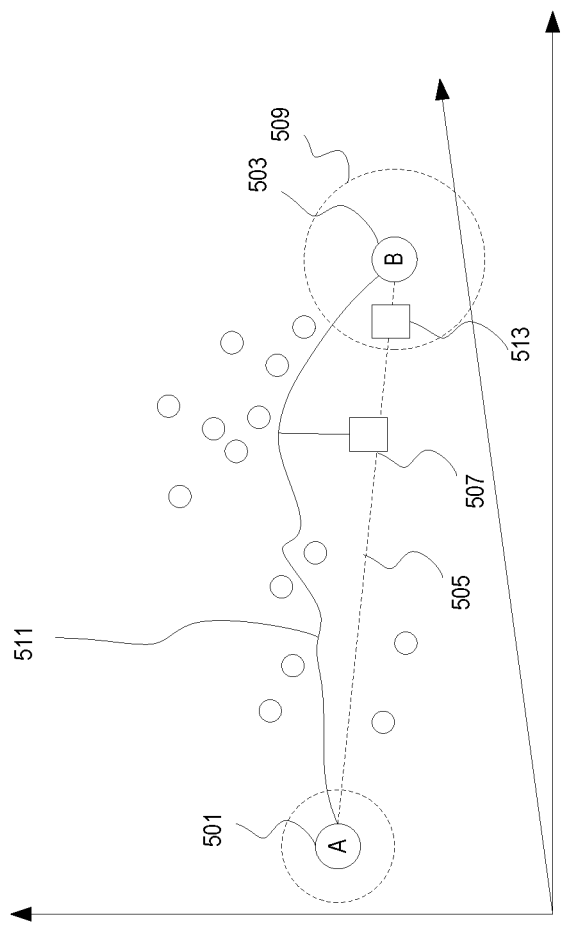
FIG. 5 illustrates examples of DDE with privacy.

FIG. 5 illustrates examples of DDE with privacy. As noted above, the synthetic dataset generation service 104 that utilizes DDE supports considering privacy when generating a synthetic dataset in some examples. When privacy is used, DDE ensures that no synthetic datapoint too closely matches original data, nor is placed close enough for an attacker to re-identify original datapoints. In particular a new synthetic datapoint 507 is generated between a pair of pairs of datapoints A 501 and B 503 along the line 505 connecting the pair of nearest neighbors using information from other neighborhoods (the unlabeled circles), but cannot be within the no go zones such as the no go zone 509. For example, synthetic datapoint 513 would be excluded. In particular, the generation of the synthetic datapoint 507 attempts to maximize a local probability distribution (such as according to a local Kernel Density Estimate (KDE) shown as the non-straight line 511).

FIG. 6 illustrates examples of an DDE algorithm to be implemented by the synthetic dataset generation service 104 that utilizes DDE. Typically, the algorithm is performed as a method by a processing device such as a CPU, GPU, or APU. Note that the algorithm is stored as one or more code modules to be executed by such a processing device. In some examples, this variant of DDE works better on categorical and/or binary data.

Line 1 of the illustrated algorithm details exemplary inputs. These inputs may be provided by the user requesting the creation of the synthetic data. Note that some of the inputs are not always used (for example, there may be a default of privacy (meaning priv is not supplied). In some examples, default values are used such as the number of pairs of datapoints, metric(s) to use, etc.

Line 2 illustrates examples of items to be initialized. These include a number of classes (e.g., number of features to evaluate), a collection of pairs of datapoints per class (such as A and B shown in subsequent figures), a collection of pairs of datapoints for the entire dataset to the collection of nearest neighbors, a configuration of "no go zones" which are zones around a point that synthetic datapoint is not allowed to exist, and an empty set.

Within a first for loop, lines 4 and 5 set a first datapoint and its nearest neighbors.

Within the second for loop, line 7 sets a second datapoint to be evaluated as a datapoint relative to the first point. Line 8 sets neighborhoods for the datapoint to pairs of datapoints for the first and second datapoint. In lines 9-11 a local, feature-wise density estimation is calculated. In particular, a local density estimation is performed in a single data dimension with a multinomial distribution.

Each feature is sampled from the calculated feature-wise density estimation to generate a potential datapoint at line 12.

At line 13 a determination of if a potential datapoint is within a no go zone is made. If it is, then a resample is performed to generate a potential datapoint at line 14.

The potential datapoint of either line 12 or line 14 is potentially added at line 16.

Figure 7:
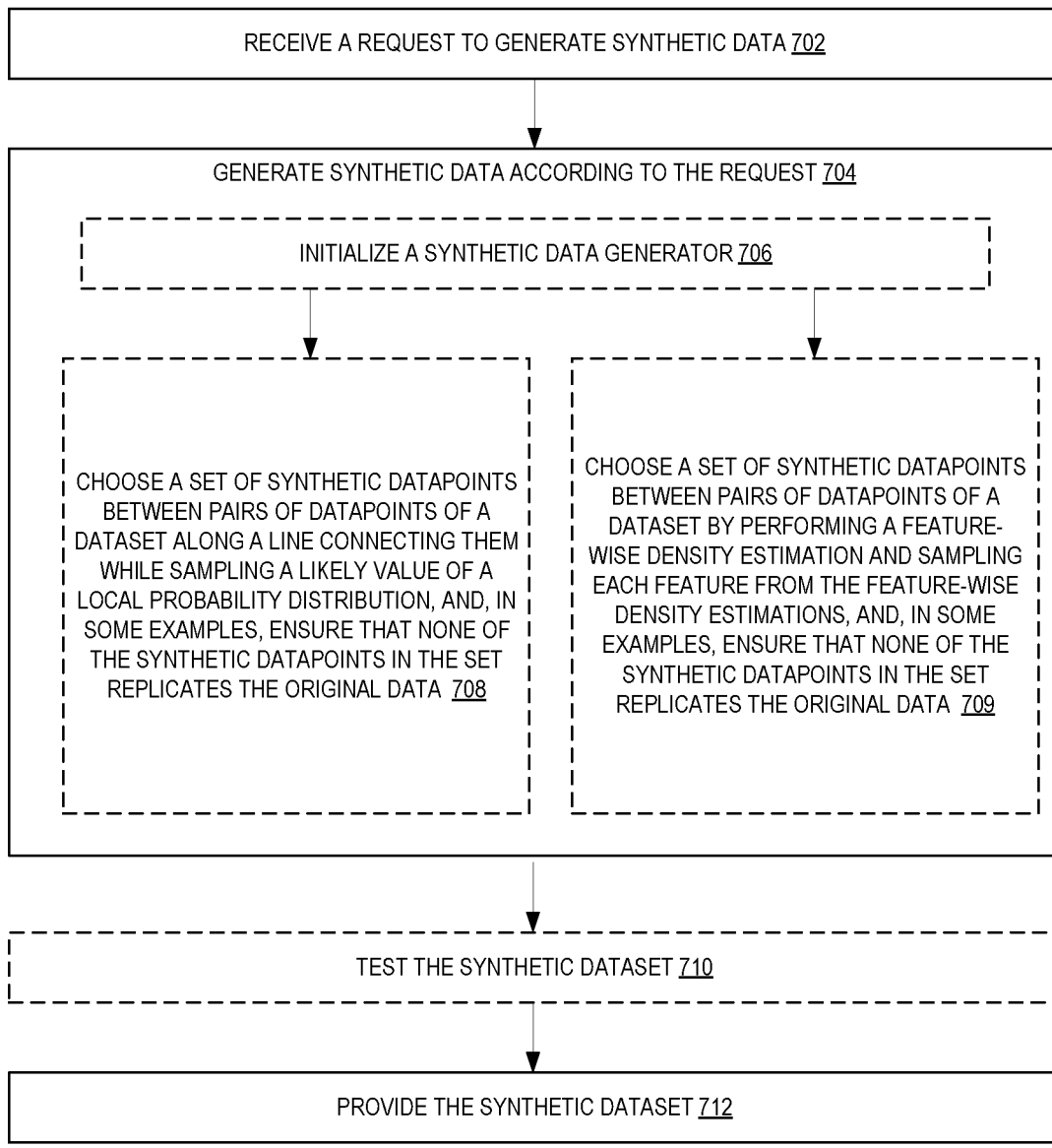
FIG. 7 is a flow diagram illustrating operations of a method for generating synthetic data according to some embodiments.

FIG. 7 is a flow diagram illustrating operations of a method for generating synthetic data according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by synthetic dataset generation service 104 that utilizes DDE and/or the ML model training and/or testing service 106 of the other figures.

At 702 one or more requests to generate synthetic data is received. This request may be a plurality of inputs into one or more CLIs or GUIs. Examples of the types of input for this request or requests have been detailed above.

A synthetic dataset is generated according to the request at 704. For example, DDE is performed. This generation may have multiple acts. For example, a synthetic data generator is initialized at 706 in some examples. This initialized generator is then used to choose a set of synthetic datapoints between pairs of datapoints of a dataset along a line connecting them while sampling a likely value of a local probability distribution, and, in some examples, ensure that none of the synthetic datapoints in the set too closely matches the original data at 708. In other examples, a set of synthetic datapoints between pairs of datapoints of a dataset is chosen by performing one or more feature-wise density estimations and sampling each feature from those feature-wise density estimations, and, in some examples, ensure that none of the synthetic datapoints in the set too closely matches the original data at 709.

In some examples, the synthetic dataset is tested at 710. For example, the synthetic dataset is used to train a ML model and the performance of that ML model is compared to a ML model trained with the original dataset.

The synthetic dataset is provided at 712 as configured by the request. For example, in most instances it is stored at a designated location.

Figure 8:
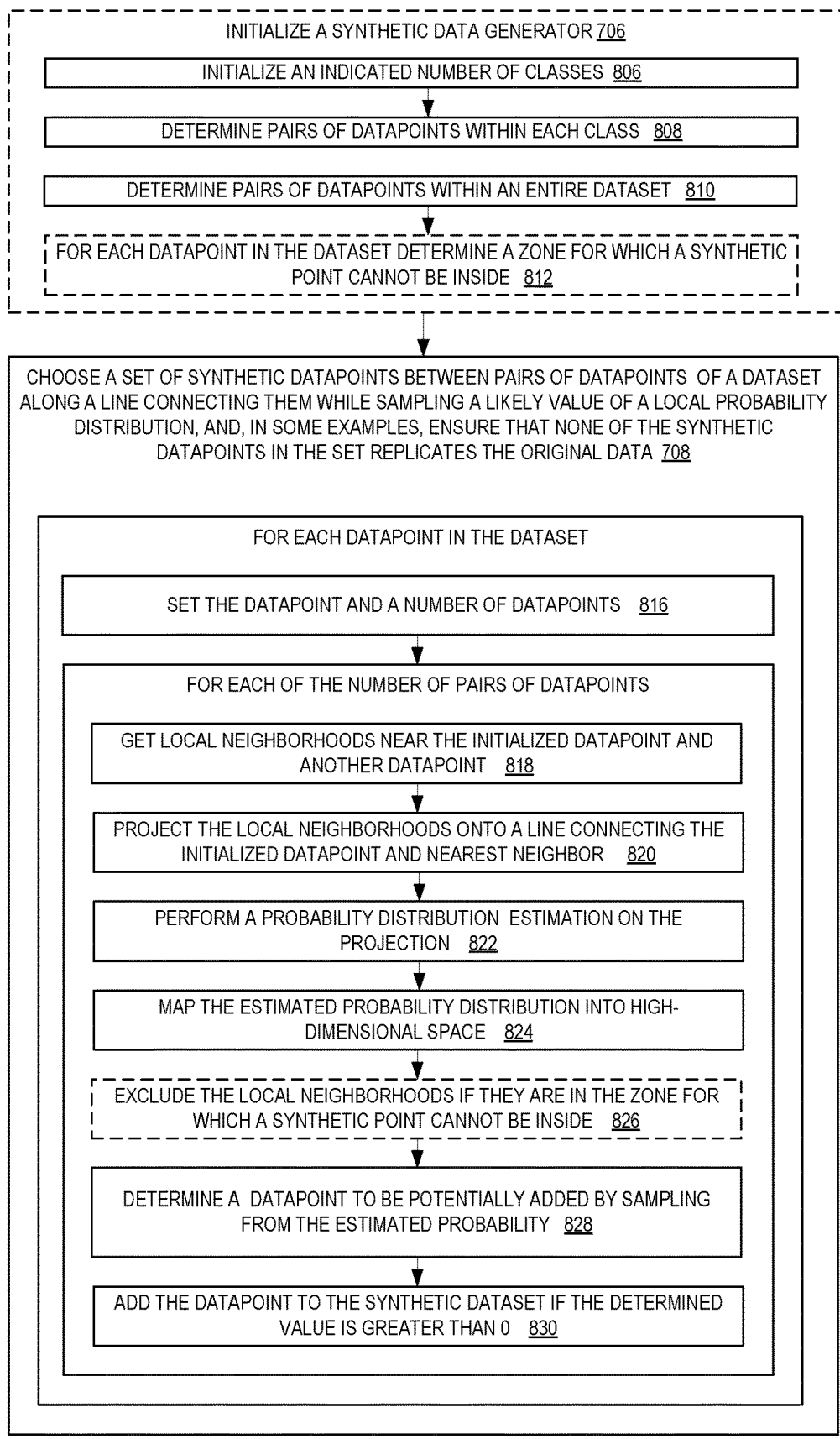
FIG. 8 is a flow diagram illustrating operations of a method for generating synthetic data according to some embodiments.

FIG. 8 is a flow diagram illustrating operations of a method for generating synthetic data according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by synthetic dataset generation service 104 that utilizes DDE and/or the ML model training and/or testing service 106 of the other figures. In particular, this flow illustrates the initialization of a synthetic data generator at 606 and choosing of a set of synthetic datapoints between pairs of datapoints of a dataset along a line connecting them while sampling a likely value of a local probability distribution, and, in some examples, ensuring that none of the synthetic datapoints in the set too closely matches the original data at 608

The initialization of the synthetic dataset generator may include several acts. An indicated number of classes at initialized at 806. This number may be a default value or provided by a request for synthetic dataset generation.

Pairs of datapoints within each class of the original dataset are determined at 808. This may be based on a weighted metric that is a default value or provided by a request for synthetic dataset generation. Any nearest neighbor determination technique may be used in some examples.

Pairs of datapoints within the entire original dataset are determined at 810. This determination is made based on distance metrics such as a (weighted) Euclidean distance, Manhattan distance, etc. The metric(s) may be default or provided by a request for synthetic dataset generation.

In some examples, when privacy is desired, for each datapoint in the original dataset a zone for which a synthetic point cannot be inside at 712. This creates the no go zones. In particular, the datapoints are to be unidentifiable to protect against reidentification scenarios by minimizing the risk of singling out as estimated by the identifiability risk. The choosing of a set of synthetic datapoints between pairs of datapoints of a dataset along a line connecting them while sampling a likely value of a local probability distribution, and, in some examples, ensure that none of the synthetic datapoints in the set too closely matches the original data at 608 may also include several acts.

For each datapoint in the original dataset several acts may be performed as detailed below. At 816, the datapoint and a number of nearest neighbors are set. Then, for each of the number of nearest neighbors, a plurality of acts is performed.

Local neighborhoods near the set datapoint and the number of pairs of datapoints are determined at 818. These local neighborhoods are projected onto a line connecting the initialized datapoint and the pairs of datapoints at 820. The projection is a 1-D projection.

A probability distribution estimation (e.g., a density estimate (such as KDE)) is performed on the projection at 822. The probability distribution estimation value is then mapped into high-dimensional space (e.g., the high-dimensional space of the original dataset) at 824. When privacy is to be taken into account, the local neighborhoods are excluded if they are in the zone for which a synthetic point cannot be inside at 826.

A value for a datapoint to potentially added to the synthetic dataset is determined by sampling from the estimated probability at 828.

The datapoint is added to the synthetic dataset if the determined value of 728 is greater than 0 at 830.

Figure 9:
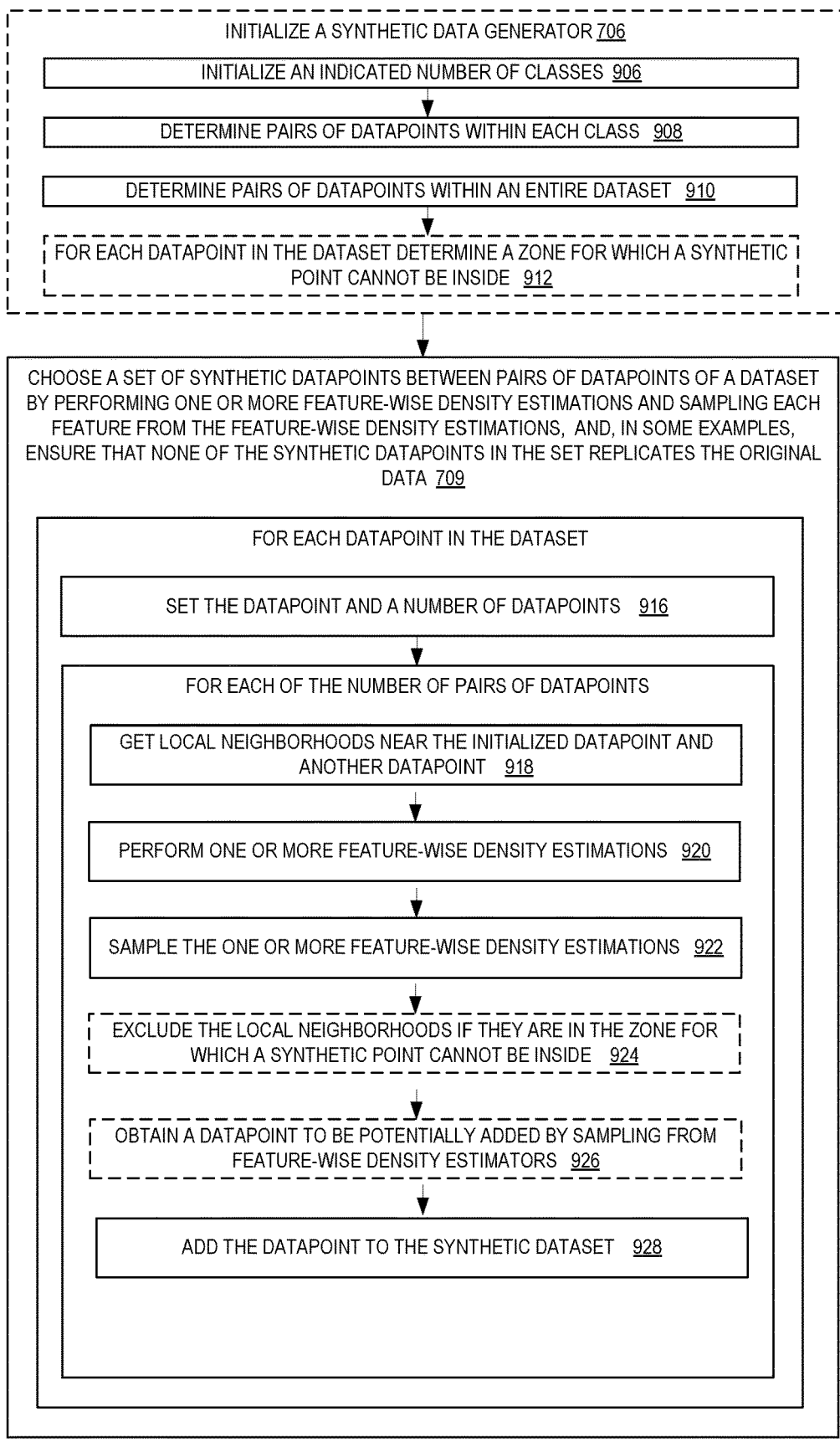
FIG. 9 is a flow diagram illustrating operations of a method for generating synthetic data according to some embodiments.

FIG. 9 is a flow diagram illustrating operations of a method for generating synthetic data according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by synthetic dataset generation service 104 that utilizes DDE and/or the ML model training and/or testing service 106 of the other figures. In particular, this flow illustrates the initialization of a synthetic data generator at 706 and choosing a set of synthetic datapoints between pairs of datapoints of a dataset by performing one or more feature-wise density estimations and sampling each feature from the feature-wise density estimations, and, in some examples, ensure that none of the synthetic datapoints in the set too closely matches the original data at 709.

The initialization of the synthetic dataset generator may include several acts. An indicated number of classes at initialized at 906. This number may be a default value or provided by a request for synthetic dataset generation.

Pairs of datapoints within each class of the original dataset are determined at 908. This may be based on a weighted metric that is a default value or provided by a request for synthetic dataset generation. Any nearest neighbor determination technique may be used.

Pairs of datapoints within the entire original dataset are determined at 910. This determination is made based on distance metrics such as a (weighted) Euclidean distance, Manhattan distance, etc. The metric(s) may be default or provided by a request for synthetic dataset generation.

In some examples, when privacy is desired, for each datapoint in the original dataset a zone for which a synthetic point cannot be inside at 912. This creates the no go zones. In particular, the datapoints are to be unidentifiable to protect against reidentification scenarios by minimizing the risk of singling out as estimated by the identifiability risk.

The choosing of a set of synthetic datapoints between pairs of datapoints of a dataset along a line connecting them while sampling a likely value of a local probability distribution, and, in some examples, ensure that none of the synthetic datapoints in the set too closely matches the original data at 709 may also include several acts.

For each datapoint in the original dataset several acts may be performed as detailed below. At 916, the datapoint and a number of nearest neighbors are set. Then, for each of the number of nearest neighbors, a plurality of acts is performed.

Local neighborhoods near the set datapoint and the number of pairs of datapoints are determined at 918. One or more feature-wise density estimations are performed at 920. The one or more feature-wise density estimations are sampled at 922. When privacy is to be taken into account, the local neighborhoods are excluded if they are in the zone for which a synthetic point cannot be inside at 924. A datapoint to be potentially added is obtained by sampling from feature-wise density estimator at 926.

The sampled datapoint is added to the synthetic dataset at 928.

Figure 10:
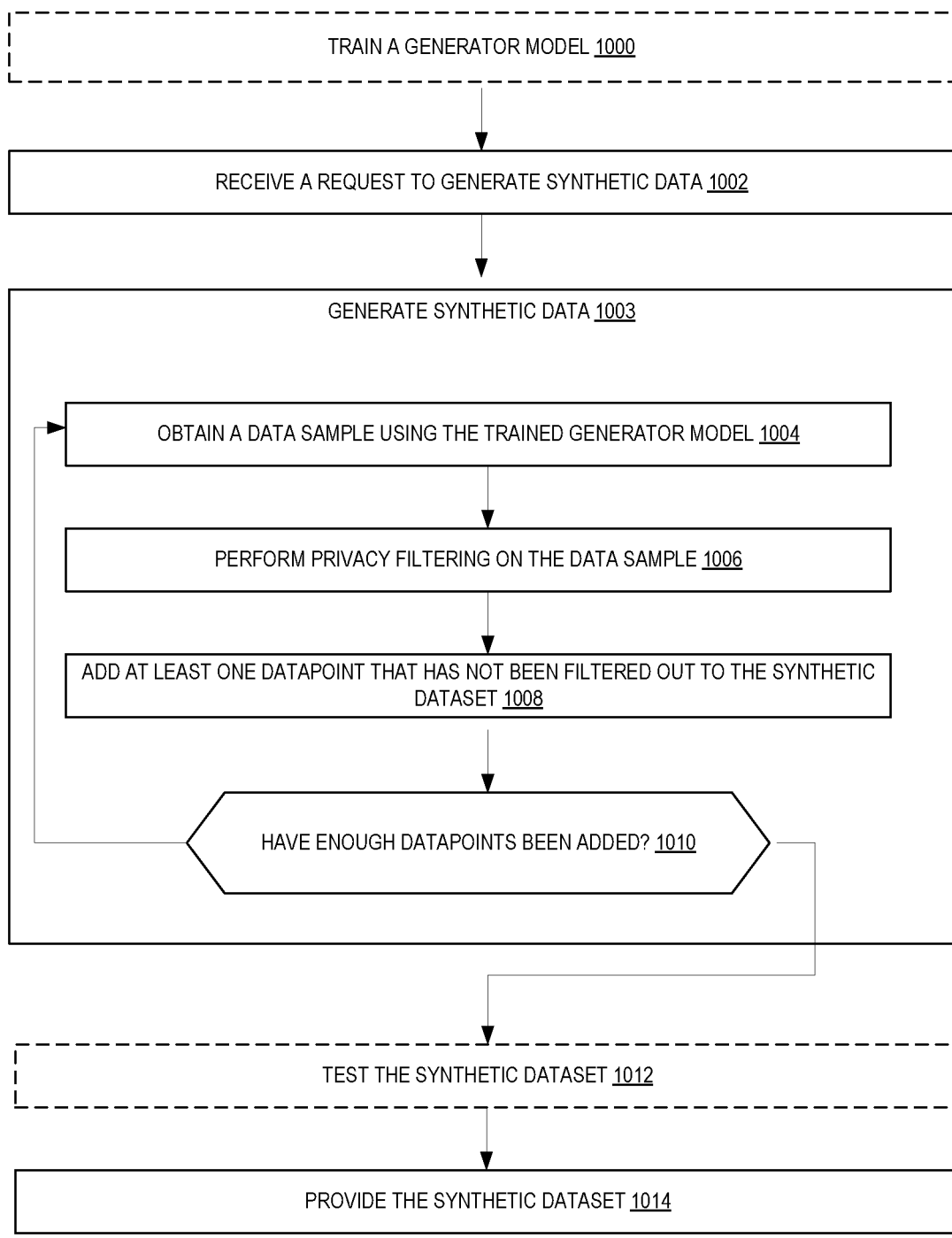
FIG. 10 is a flow diagram illustrating operations of a method for generating synthetic data according to some embodiments.

FIG. 10 is a flow diagram illustrating operations of a method for generating synthetic data according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by the synthetic dataset generation service using privacy filtering 105 and/or the ML model training and/or testing service 106 of the other figures.

At 1000, in some examples, a generator model is trained.

At 1002 one or more requests to generate synthetic data is received. This request may be a plurality of inputs into one or more CLIs or GUIs. Examples of the types of input for this request or requests have been detailed above such as one or more of an identification of location of the first dataset, the first dataset itself, a number of synthetic datapoints to generate, an identification of location of where to store the synthetic dataset, or an indication of metrics to use to minimize identifiability.

A synthetic dataset is generated according to the request at 1003. This generation may have multiple acts.

A data sample using the trained generator model is obtained at 1004. In particular, the trained generator model uses existing data (as indicated or provided by the one or more requests) to generate a data sample. For example, a subset of a dataset indicated or provided by the one or more requests is used to generate the data sample.

Privacy filtering is performed on the data sample at 1006. For example, datapoints that are not different enough from the original data are removed. In particular, those that are not $\in$-identifiable are removed in some examples.

At least one datapoint that has not been filtered is added out to the synthetic dataset at 1008.

In some examples, a determination is made of if there have been enough datapoints been added to the dataset at 1010. For example, has the amount of datapoints as indicated by the one or more requests been added?

In some examples, the synthetic dataset is tested at 1012. For example, the synthetic dataset is used to train a ML model and the performance of that ML model is compared to a ML model trained with the original dataset.

The synthetic dataset is provided at 1014 as configured by the request. For example, in most instances it is stored at a designated location.

Figure 11:
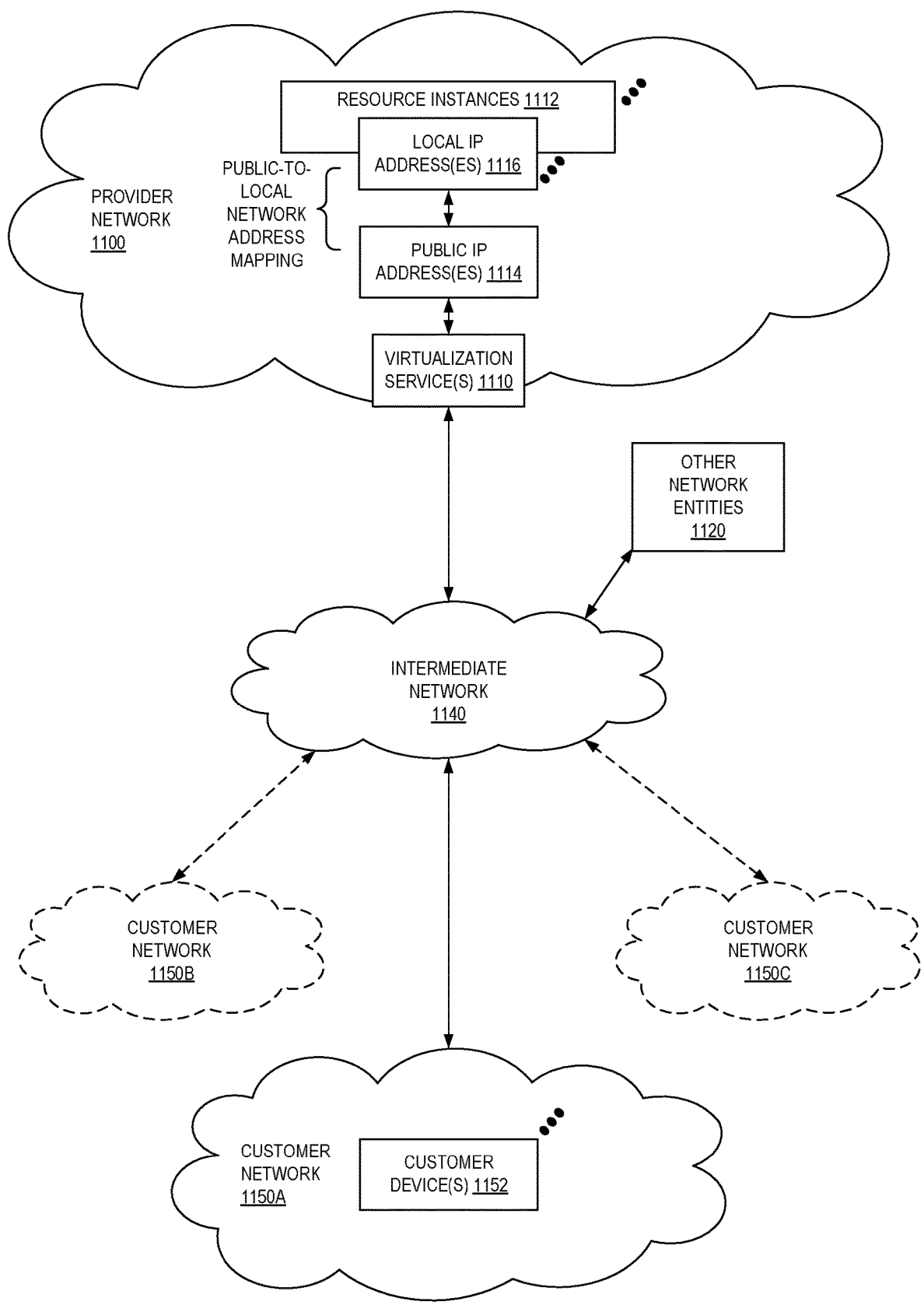
FIG. 11 illustrates an example provider network environment according to some embodiments.

FIG. 11 illustrates an example provider network (or "service provider system") environment according to some embodiments. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some embodiments, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
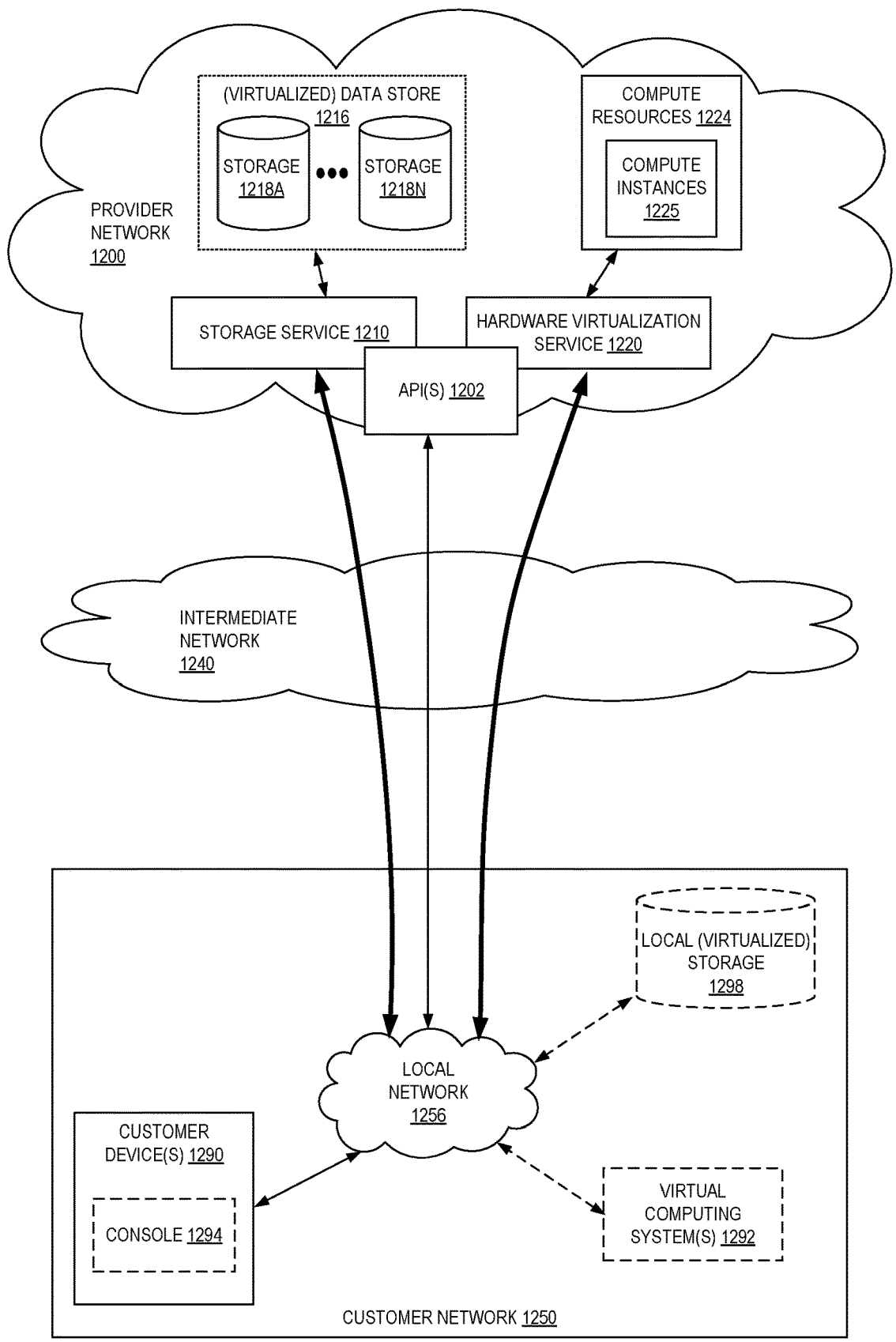
FIG. 12 is a block diagram of an example provider network that provides a storage service and a hardware virtualization service to customers according to some embodiments.

FIG. 12 is a block diagram of an example provider network environment that provides a storage service and a hardware virtualization service to customers, according to some embodiments. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some embodiments, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some embodiments, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some embodiments, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some embodiments, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
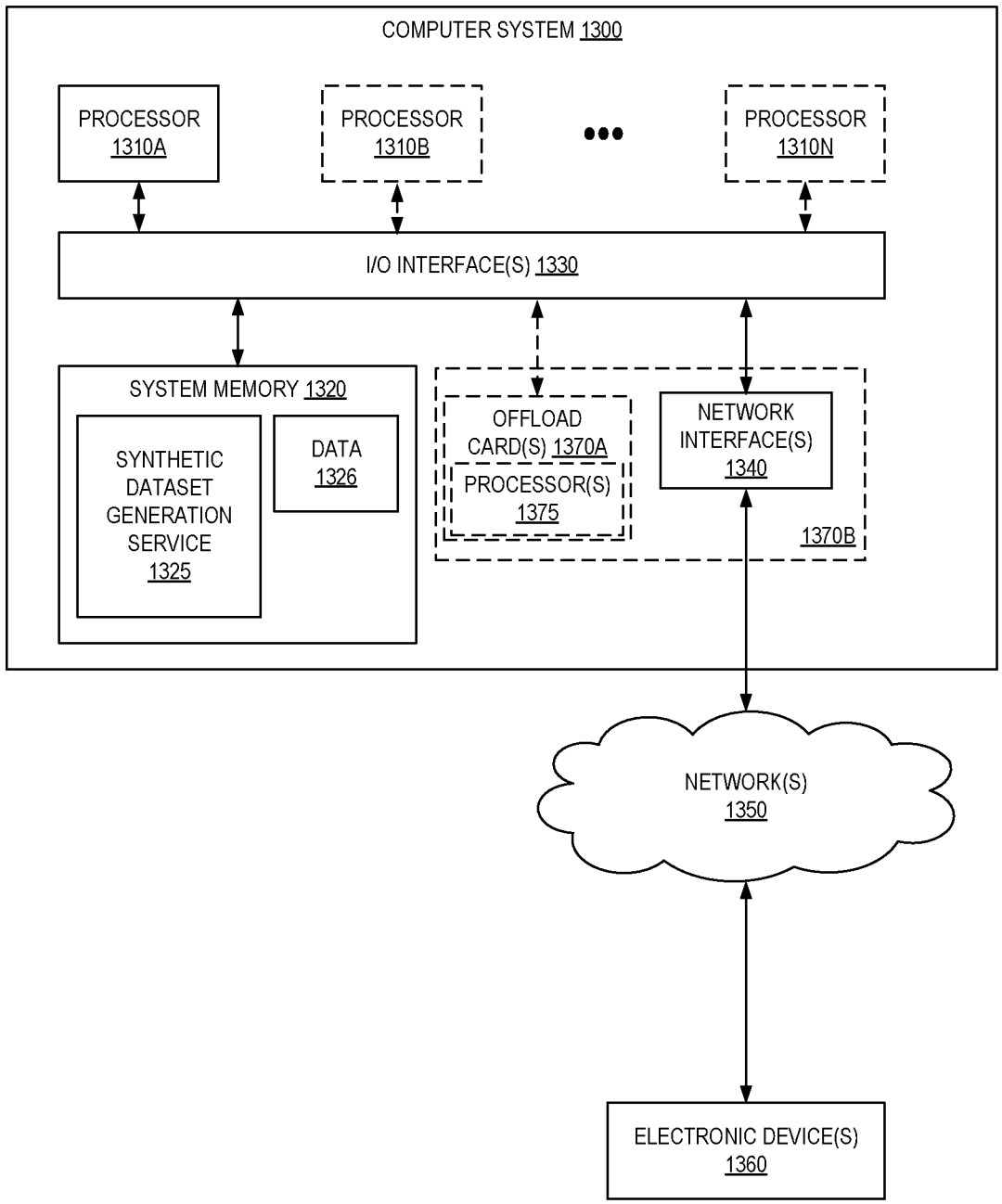
FIG. 13 is a block diagram illustrating an example computer system that can be used in some embodiments.

In some embodiments, a system that implements a portion or all of the techniques described herein can include a general-purpose computer system, such as the computer system 1300 illustrated in FIG. 13, that includes, or is configured to access, one or more computer-accessible media. In the illustrated embodiment, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various embodiments the computer system 1300 can include one computing device or any number of computing devices configured to work together as a single computer system 1300.

In various embodiments, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various embodiments, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various embodiments, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1320 as synthetic dataset generation service DDE-code 1325 (e.g., executable to implement, in whole or in part, the synthetic dataset generation service utilizing DDE service 104 and/or the synthetic dataset generation service using privacy filtering 105) and data 1326.

In some embodiments, the I/O interface 1330 can be configured to coordinate I/O traffic between the processor 1310, the system memory 1320, and any peripheral devices in the device, including the network interface 1340 and/or other peripheral interfaces (not shown). In some embodiments, the I/O interface 1330 can perform any necessary protocol, timing, or other data transformations to convert data signals from one component (e.g., the system memory 1320) into a format suitable for use by another component (e.g., the processor 1310). In some embodiments, the I/O interface 1330 can include support for devices attached through various types of peripheral buses, such as a variant of the Peripheral Component Interconnect (PCI) bus standard or the Universal Serial Bus (USB) standard, for example. In some embodiments, the function of the I/O interface 1330 can be split into two or more separate components, such as a north bridge and a south bridge, for example. Also, in some embodiments, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various embodiments, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some embodiments the offload card(s) 1370A or 1370B can perform compute instance management operations, such as pausing and/or un-pausing compute instances, launching and/or terminating compute instances, performing memory transfer/copying operations, etc. These management operations can, in some embodiments, be performed by the offload card(s) 1370A or 1370B in coordination with a hypervisor (e.g., upon a request from a hypervisor) that is executed by the other processors 1310A-1310N of the computer system 1300. However, in some embodiments the virtualization manager implemented by the offload card(s) 1370A or 1370B can accommodate requests from other entities (e.g., from compute instances themselves), and cannot coordinate with (or service) any separate hypervisor.

In some embodiments, the system memory 1320 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving a request to generate synthetic data based at least in part on a first dataset, the first dataset including datapoints having M dimensions, wherein M is greater than one;
generating the synthetic dataset according to the request, the generating comprising projecting a number of datapoints from the first dataset into a one-dimensional space, generating a probability distribution based on the projected datapoints, and generating a new synthetic datapoint for the synthetic dataset based on mapping one or more sampled values from the probability distribution back into the M-dimensional space; and
providing the synthetic dataset as configured by the request.

2. The computer-implemented method of claim 1, the request includes one or more of an identification of what features to exclude from the first dataset, an identification of location of the first dataset, the first dataset itself, a number of synthetic datapoints to generate, an identification of location of where to store the synthetic dataset, a number of pairs of datapoints to consider, a neighborhood size, or an indication of metrics to use to minimize identifiability.

3. The computer-implemented method of claim 1, wherein the first dataset and synthetic dataset have a high dimensionality.

4. A computer-implemented method comprising:
receiving a request to generate synthetic data based on a first dataset, the first dataset including datapoints having M dimensions, wherein M is greater than one;
generating the synthetic dataset according to the request by choosing a set of synthetic datapoints between pairs of datapoints of the first dataset, mapped into a one-dimensional space, along a line connecting them in the one-dimensional space, via sampling a value of a local probability distribution; and
providing the synthetic dataset as configured by the request.

5. The computer-implemented method of claim 4, wherein the request includes one or more of an identification of what features to exclude from the first dataset, an identification of location of the first dataset, the first dataset itself, a number of synthetic datapoints to generate, an identification of location of where to store the synthetic dataset, a number of pairs of datapoints to consider, a neighborhood size, or an indication of metrics to use to minimize identifiability.

6. The computer-implemented method of claim 4, wherein generating the synthetic dataset comprises:
initializing an indicated number of classes;
determining pairs of datapoints within each class;
determining pairs of datapoints within the first dataset;
for each datapoint in the first dataset:
setting the datapoint and a number of pairs of datapoints relative to that datapoint;
for each of the number of pairs of datapoints,
getting local neighborhoods near the initialized datapoint and pairs of datapoints,
projecting the local neighborhoods onto a line connecting the initialized datapoint and pairs of datapoints,
performing a probability distribution estimation on the projection,
mapping the distribution estimation into high-dimensional space,
determining a value for a datapoint to potentially be added based on a sample from a likely distribution value based on the probability distribution estimation, and
adding the datapoint to the synthetic dataset when the determined probability of the datapoint to be potentially added is greater than a set value.

7. The computer-implemented method of claim 4, wherein:
the request indicates that privacy should be taken into consideration when generating the synthetic datapoints of the dataset, and
generating the synthetic dataset further comprises:
for each datapoint in the first dataset, determining a zone for which a synthetic point cannot be inside; and
excluding the projected local neighborhoods if they are in the zone for which a synthetic point cannot be inside.

8. The computer-implemented method of claim 7, wherein privacy is compliant with aspects of Health Insurance Portability and Accountability Act (HIPAA).

9. The computer-implemented method of claim 7, wherein privacy is compliant with at least aspects of article 29 of General Data Protection Regulation (GDPR).

10. The computer-implemented method of claim 4, wherein privacy ensures that a given datapoint in the synthetic dataset is not identifiable.

11. The computer-implemented method of claim 4, wherein the first dataset and synthetic dataset have a high dimensionality.

12. The computer-implemented method of claim 6, wherein each projection is a one-dimensional projection.

13. The computer-implemented method of claim 6, wherein the probability distribution estimation is performed using kernel density estimation.

14. The computer-implemented method of claim 4, further comprising:
testing the synthetic dataset against the first dataset using trained machine learning models before providing the synthetic dataset.

15. A system comprising:
a first one or more electronic devices to implement a data storage service in a multi-tenant provider network; and
a second one or more electronic devices to implement a synthetic dataset generation service in the multi-tenant provider network, the synthetic dataset generation service including instructions that upon execution cause the synthetic dataset generation service to:
receive a request to generate synthetic data based on a first dataset stored by the data storage service, the first dataset including datapoints having M dimensions, wherein M is greater than one;
generate the synthetic dataset according to the request by choosing a set of synthetic datapoints between pairs of datapoints of the first dataset, mapped into a one-dimensional space, along a line connecting them in the one-dimensional space, via sampling a value of a local probability distribution; and
provide the synthetic dataset as configured by the request.

16. The system of claim 15, wherein:
the request indicates that privacy should be taken into consideration when generating the synthetic datapoints of the dataset, and
generating the synthetic dataset further comprises:
for each datapoint in the first dataset, determining a zone for which a synthetic point cannot be inside; and
excluding the projected local neighborhoods if they are in the zone for which a synthetic point cannot be inside.

17. The system of claim 16, wherein privacy ensures that a given datapoint in the synthetic dataset is not identifiable.

18. The system of claim 16, wherein privacy is compliant with at least aspects of article 29 of General Data Protection Regulation (GDPR).

19. The system of claim 16, wherein privacy is compliant with aspects of Health Insurance Portability and Accountability Act (HIPAA).

20. The system of claim 15, further comprising a testing service to test the synthetic dataset.

\* \* \* \* \*